March 18, 1947. G. LEVESQUE DU ROSTU 2,417,591
COOLING DEVICE OF INTERNAL COMBUSTION ENGINE
Filed July 20, 1945 2 Sheets-Sheet 1
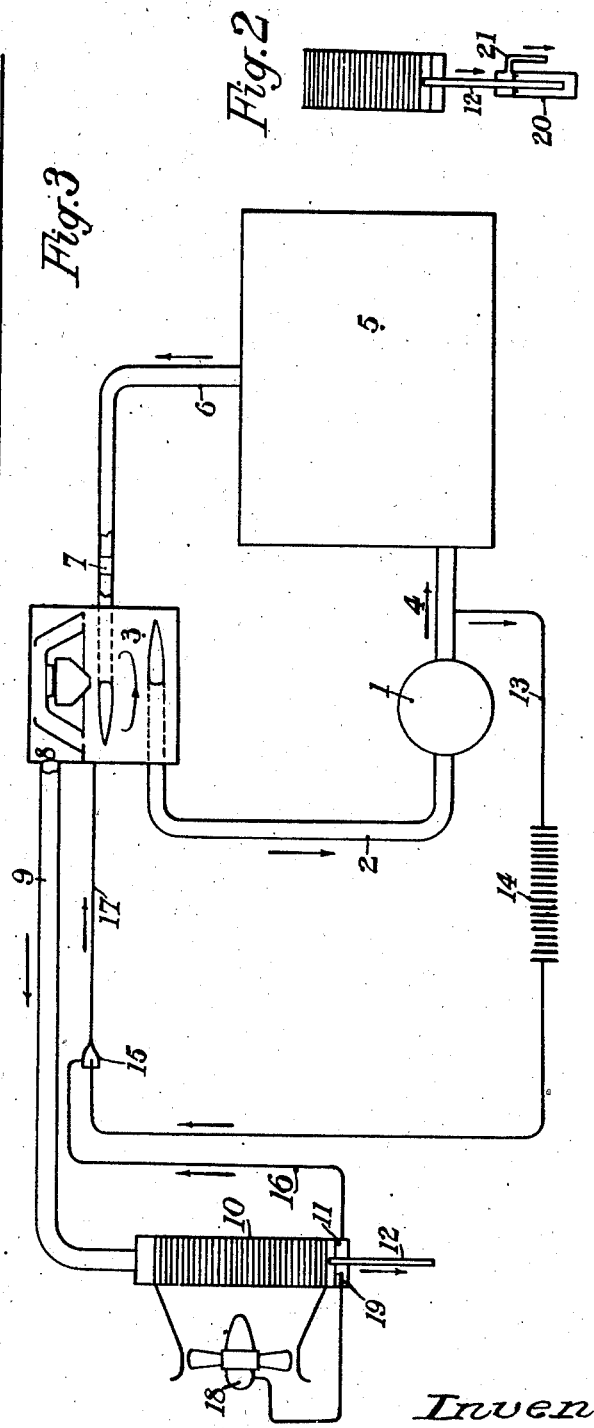
Inventor
G. Levesque du Rostu

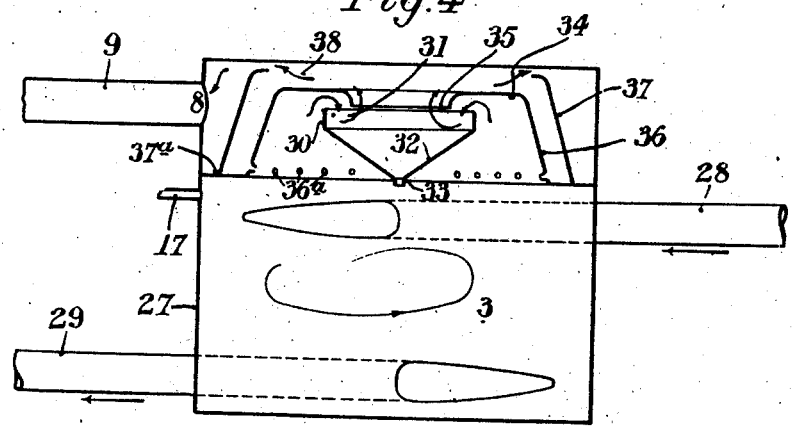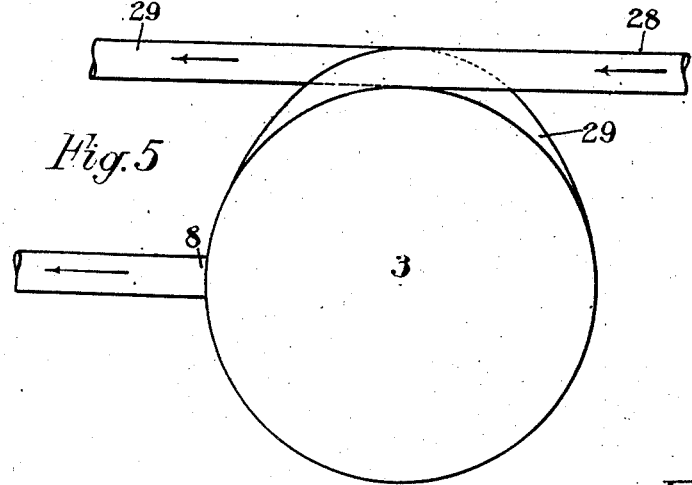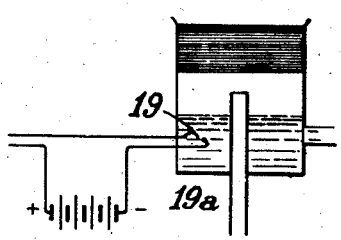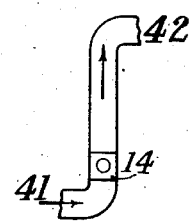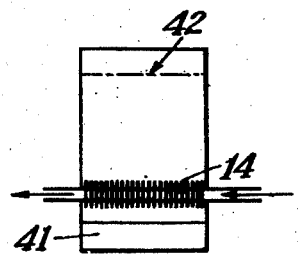

Patented Mar. 18, 1947

2,417,591

UNITED STATES PATENT OFFICE 2,417,591

COOLING DEVICE OF INTERNAL-COMBUSTION ENGINES

Georges Levesque du Rostu, Paris, France, assignor to Société Anonyme Andre Citroen, Paris, France Application July 20, 1945, Serial No. 606,078½
In France July 16, 1941

4 Claims. (Cl. 123—174)

The present invention relates to cooling devices of internal combustion engines in which a portion of the cooling fluid is changed into steam, condensed and returned to the cooling circuit, whilst the other portion remains in the liquid state in this circuit. It relates more particularly to applications of this device to automobile motors.

For the convenience of the specification, the cooling fluid shall be designated in the course of the description as being water.

Apparatuses which make use of this principle usually exhibit the following drawbacks:

1. The steam flowing towards the condenser carries with it a certain amount of water by "priming."
2. The condenser is mechanically cooled by a fan of comparatively high power.
3. The driving off of the air from the steam and condensation water circuit is ensured by air cocks whose operation is often defective.
4. The condensation water pump is a sensitive mechanism whose breakdown can cause serious damage.
5. The maintenance under pressure of the water circuit, which is an important condition for good cooling of motor jackets, is generally defectively carried out, especially at low speeds, when making use of a centrifugal pump as the driving agent for the circulation.

In order to obviate these drawbacks, in accordance with the invention, use is made of a steam generating apparatus provided with deflectors producing several changes of direction of the steam developed, prior to its being drawn off, and thereby efficiently drying same; the condenser can be cooled by an electric motor fan unit absorbing very little power and thermostatically controlled by the temperature of the condensation water.

The air drain pipes are composed of tubes having a small diameter passing through the bottom of the condenser and issuing, on the one hand, within the condenser, at a certain level above this bottom, and on the other hand, outside the condenser, at a substantially lower level; the return of the condensation water is ensured by an injector fed by the water coming from the cooling water circuit and drawn off on the delivery side of the water pump; in the cooling water circuit, after the motor to be cooled and before the steam generating apparatus is mounted a throttling device or automatic cut off which operates in case of an insufficient output of the cooling water.

The accompanying drawing illustrates diagrammatically, purely in an indicative but no wise in a limitative manner, a form of embodiment of the present invention.

Fig. 1 shows diagrammatically the plant as a whole.

Fig. 2 is a partial view of the condenser showing a variant of the air draining device.

Fig. 3 is a view on a larger scale of a throttling device of the outlet circuit of the motor, prior to the inlet to the steam generating device.

Figs. 4 and 5 are views on a larger scale of this steam generator, respectively in longitudinal section by a vertical plane, and in plan;

Fig. 6 illustrates diagrammatically a variant of a detail.

Fig. 7 is a diagrammatic showing of the thermostat associated with the arrangement disclosed.

Fig. 8 is a side-view corresponding to Fig. 6 and relating to auxiliary cooling means.

The cooling water circuit comprises the centrifugal pump 1, the suction pipe 2 leading the steam generator 3, the delivery pipe 4 to the motor 5, the outlet pipe 6 from the motor and the throttling device 7.

The steam circuit comprises the point of outlet 8 of the steam, the connecting pipe 9 to the condenser 10, the condensation water box 11 thereof with its air drain 12 which issues directly into the atmosphere.

The circuit for the return of condensation water comprises a pipe 13 for the impelling hot water, having its starting point on the delivery side 4 of the pump 1 and provided with a pipe portion 14 having ribs, the exhauster-injector 15, the condensation water suction pipe 16 and the return pipe 17 to the steam generator 3.

The cooling device by ventilation of the condenser 10 comprises an electrically driven motor-fan unit 18 whose motor is controlled by a thermostat 19 provided in the condensation water box 11. The unit 18 is arranged at the inlet end of an air channel leading to the condenser 10.

In Fig. 2, the draining pipe 12, instead of issuing directly into the atmosphere, as in Fig. 1, dips into a tube 20 closed at its two ends and containing a certain quantity of water the upper level of which is limited by an overflow pipe 21.

The throttle 7 (Fig. 3) is composed of a converging nozzle 22 whose outlet can be closed more or less by a diaphragm 23 mounted on a spindle 24 which slides smoothly in the support 25 mounted in the pipe 6 before the nozzle 22.

A spring 26, suitably loaded, constantly urges the diaphragm against the outlet orifice of the nozzle.

The steam generating apparatus 3 (Figs. 4 and 5) is formed of a cylindrical body 27, to which is tangentially connected an inlet pipe 28 and an outlet pipe 29 for the water and a system of cylindrical and conical baffle plates that are coaxial with respect to the steam generator.

The central baffle plate 30 comprises a cylindrical portion 31 connected, at its lower end, with a conical portion 32, the apex of which is downwardly directed and is provided with a central opening 33 for drainage.

The intermediary baffle plate comprises a central opening 35 having a smaller diameter than that of the cylindrical portion 31 of the central baffle plate 30, surrounded by a horizontal ring portion 34 connected to a conical portion 36 at the lower part of which is provided a number of small drainage holes 36a distributed on the periphery.

The outer baffle plate consists of a conical wall 37 substantially parallel to the conical portion 36 of the intermediary baffle plate and leaving between it and the cover of the steam generator an outlet passage 38. It is connected at its lower end with an annular portion 37a which extends outwardly to the cylindrical body 27 of the steam generator 3 and inwardly to the lower part of the conical portion 36 of the intermediary baffle plate.

The steam outlet 8 is situated in the upper part of the cylindrical body 27 of the steam generator 3 outside the outer baffle plate 37.

The apparatus operates as follows:

At the time when the motor is started, the latter being supposed to be cold, the water is at a certain level in the steam generator 3, and its circulation takes place in the direction indicated by the arrows, owing to the action of the centrifugal pump 1. The temperature of this water rises progressively and rapidly. During this temperature rise, the air contained in the pipes and the various members is expelled through the pipe 9 to the condenser 10 whence it is evacuated outside by the air drain 12. The water cannot escape in fact through said air drain as the end of the latter opens inside the lower compartment of the condenser above the level of the water condensed therein, which level passes necessarily through the connection with the suction pipe 16 leading to the box or container 11, the output of the injector 15 adapted to suck the condensed water through said pipe being always higher than the production of such condensed water.

In the variant shown in Fig. 2; air firstly enters the tube 12 whence it is finally expelled outside through pipe 21, either freely, in case of a first operation, or after having bubbled through a certain quantity of water, in the usual case, such water arising from the condensation due to previous cooling.

When the temperature of the water reaches 100° C., as the internal pressure of the steam generator 3 is maintained substantially at the same value as that of the surrounding atmosphere, due to the small pressure losses of the steam circuit, the steam flows out through pipe 9 and this temperature of 100° C. is maintained in the steam generator whatever be the load and the speed of the motor. The steam condenses during its passage through the condenser 10 and tends to accumulate in the box 11. The steam contained in this box cannot escape outside owing to the depending pipe 12 and the receptacle 20 which form an hydraulic valve (Fig. 2). In the event of an accidental over-pressure, the external evacuation takes place by breakage of the water head.

If the motor runs at a reduced speed, for example at fixed or starting point, the condenser is badly cooled, and the value of the temperature of the condensation water tends to increase. When this value reaches a certain predetermined maximum, for example 90° C., the expansion thermostat 19 closes the electric circuit on the motor of the motor-fan unit 18, which starts running.

From this moment, the value of the temperature of the condensation water tends to decrease; when it reaches a certain minimum, for example 70° C., the thermostat opens the electric circuit and the unit 18 is brought to a standstill. To this end, the thermostat 19 is provided with a switch 19a controlled by a double blade shown in Fig. 7, said switch being adapted to close the circuit of an electric motor controlling the fan at 18 as soon as the temperature of the condensed water has reached a predetermined value.

Thus, with this condenser cooling process, the expenditure of energy is a minimum inasmuch as the consumption of current only takes place when mechanical cooling is necessary, that is, in case the motor is operating at reduced speed or the car is being shifted about.

In normal running, natural ventilation is sufficient, and this is what takes place during the greater part of the time of operation. It should be pointed out, in any case, that the necessary power for ensuring the running of the electric motor for the fan is very small comparatively to that normally expended for the mechanical ventilation of radiators of the classical type by water cooling.

In the arrangement according to the invention, the internal water circuit of the motor is always maintained at a sufficient overpressure to prevent any local steam generation in the jackets, owing to the throttle 7, of which Fig. 3 is a diagrammatical illustration.

The hot water which arrives at 40, exerts a certain pressure on the conical valve 23 which moves, thus increasing the section of the water passage, whilst the spring 26 becomes compressed. Beyond a certain pressure, the turns of the latter are contiguous and the opening remains at a maximum.

It is especially the working at full load and at reduced speeds of rotation of the motor which constitute the unfavorable cases of cooling, since, at these low speeds, the centrifugal pump 1, usually operated directly from a shaft of the motor, produces a considerably reduced pressure. But owing to the action of the conical valve, this pressure is very substantially increased without causing any appreciable loss of output.

The separation of the water and of the steam at the outlet of the throttle 7 is obtained in a particularly efficient manner in the steam generator 3 shown diagrammatically in Figs. 4 and 5: the water and steam mixture arrives at a certain speed through the tangential pipe 28 and a first separation by a centrifugal effect is obtained in the body 27: the steam passes through the opening 35 and undergoes a second separation by repeated changes of direction. It then circulates radially at 38 with a progressive but very substantial slowing down of its speed, the effect being to dry the steam completely by allowing a separation by gravity. This dry saturated steam finally flows out through the pipe 9.

The re-circulation of the condensation water in the box 11 is produced by the injector 15. The impelling hot water which starts from pipe 4 undergoes a certain amount of cooling by its passage through the ribbed element 14 arranged preferably in a horizontal manner so as to be cooled by free convection at slow speeds or even when the car is stopped. In order that cooling may be energetic at high speeds, the axis of this element is arranged perpendicularly to the air flow.

Fig. 6 shows diagrammatically a device for improving the cooling of the ribbed pipe 14 which comprises hooded air inlet 41 and hooded air outlet 42, in the form of a vertical sheath. The cold air is admitted as shown in Fig. 8 through the cowl 41 adapted to admit the air whereby said cold air is caused to pass between the fins or ribs on the pipe 14 and to cool same, after which said air is removed through the cowl-shaped air outlet 42 as apparent in Fig. 8.

In this arrangement, the cooling of the water delivered in 13 is ensured in an energetic manner, at high speeds of motion, by a better guidance of the air streams, and at slow speeds, by the "chimney" effect of the hood 42 provided for that purpose.

The hot water cooled then enters the injector 15 where it causes the condensation water which has settled at 11, to rise by a depression effect. The mixture is finally delivered through pipe 17 to the steam generating apparatus 3.

What I claim as my invention and desire to secure by Letters Patent is:

1. Cooling device by liquid circulation for internal combustion engines comprising in combination a circuit starting from and ending at the motor jacket, a centrifugal pump inserted in this circuit, a liquid and steam separator inserted in said circuit between the motor and the said pump, a throttling device inserted in this circuit between the motor and the said separator and adapted to automatically throttle the passage of the liquid all the more as the pressure of the latter is less, a second circuit starting from the delivery side of said pump and ending at the said separator, an exhauster-injector inserted in said second circuit, a third circuit starting from the said separator receiving from the latter separated steam and ending at the suction orifice of the said exhauster-injector, a condenser inserted in the said third circuit, and a fan adapted to cool this condenser.

2. Cooling device by liquid circulation for internal combustion engines comprising in combination a circuit starting from and ending at the motor jacket, a centrifugal pump inserted in said circuit, a liquid and steam separator inserted in said circuit between the motor and the said pump, a second circuit starting from the delivery side of said pump and ending at the said separator, an exhauster-injector inserted in said second circuit, a ribbed cooler inserted in said second circuit between the delivery side of the pump and the said exhauster-injector, a third circuit starting from the said separator receiving from the latter the separated steam and ending at the suction orfice of the said exhauster-injector, a condenser inserted in said third circuit, and a fan adapted to cool said condenser.

3. Cooling device by liquid circulation for internal combustion engines comprising in combination a circuit starting from and ending at the motor jacket, a centrifugal pump inserted in said circuit, a liquid and steam separator inserted in said circuit between the motor and the said pump, a second circuit starting from the delivery side of said pump and ending at the said separator, an exhauster-injector inserted in said second circuit, a third circuit starting from said separator receiving from the latter the separated steam and ending at the suction orifice of the said exhauster-injector, a condenser inserted in said third circuit, a fan adapted to cool said condenser and electrically driven, and a thermostat, adapted to control the starting and the stopping of said fan in accordance with the temperature of the water of condensation in said condenser.

4. Cooling device by liquid circulation for internal combustion engines comprising in combination a circuit starting from and ending at the motor jacket, a centrifugal pump inserted in said circuit, a liquid and steam separator inserted in said circuit between the motor and said pump, a second circuit starting from the delivery side of said pump and ending at said separator, an exhauster-injector inserted in said second circuit, a third circuit starting from said separator receiving from the latter the separated steam and ending at the suction orifice of the said exhauster-injector, a condenser inserted in said third circuit, a fan adapted to cool said condenser and an overflow device adapted to allow an excess of water of condensation at the bottom of said condenser to escape into the atmosphere.

GEORGES LEVESQUE DU ROSTU.

REFERENCES CITED

The following references are of record in the file of this patent:

UNITED STATES PATENTS

| Number | Name | Date |
| --- | --- | --- |
| 1,405,821 | Ehrhart | Feb. 7, 1922 |
| 1,632,583 | Barlow | June 14, 1927 |
| 1,671,440 | Muir | May 29, 1928 |
| 1,860,258 | Lyon | May 24, 1932 |

FOREIGN PATENTS

| Number | Country | Date |
| --- | --- | --- |
| 245,729 | British | 1927 |